United States Patent [19]

Uhlarik

[11] 3,933,031

[45] Jan. 20, 1976

[54] SUBMARINE PIPELINE LEAK LOCATOR OR THE LIKE

[75] Inventor: William J. Uhlarik, Monterey Park, Calif.

[73] Assignee: International Telephone and Telegraph Corporation, New York, N.Y.

[22] Filed: Dec. 18, 1974

[21] Appl. No.: 533,806

[52] U.S. Cl.............................................. 73/40.5 R
[51] Int. Cl.²........................................ G01M 3/28
[58] Field of Search........................ 73/40.5 R, 438

[56] References Cited
FOREIGN PATENTS OR APPLICATIONS
738,587   8/1943   Germany........................ 73/40.5 R Primary Examiner—Richard C. Queisser
Assistant Examiner—Joseph W. Roskos
Attorney, Agent, or Firm—A. Donald Stolzy

[57] ABSTRACT

Apparatus for detecting a leak in a pipeline, e.g. in an oil filled pipeline extending from a shoreline to an underwater location below a ship, e.g. a tanker. The location of the leak is then detected in a unique manner by determining a water pressure and a liquid pressure difference. Although prior systems have incorporated a complicated and expensive controlled vacuum, it is very advantageous that the pressure difference determination need not employ such a device. It is also very advantageous that the pressure difference determination makes it possible to obtain the location of a leak in the pipeline independent of changes in atmospheric pressure, and independent of changes in tide level.

10 Claims, 7 Drawing Figures

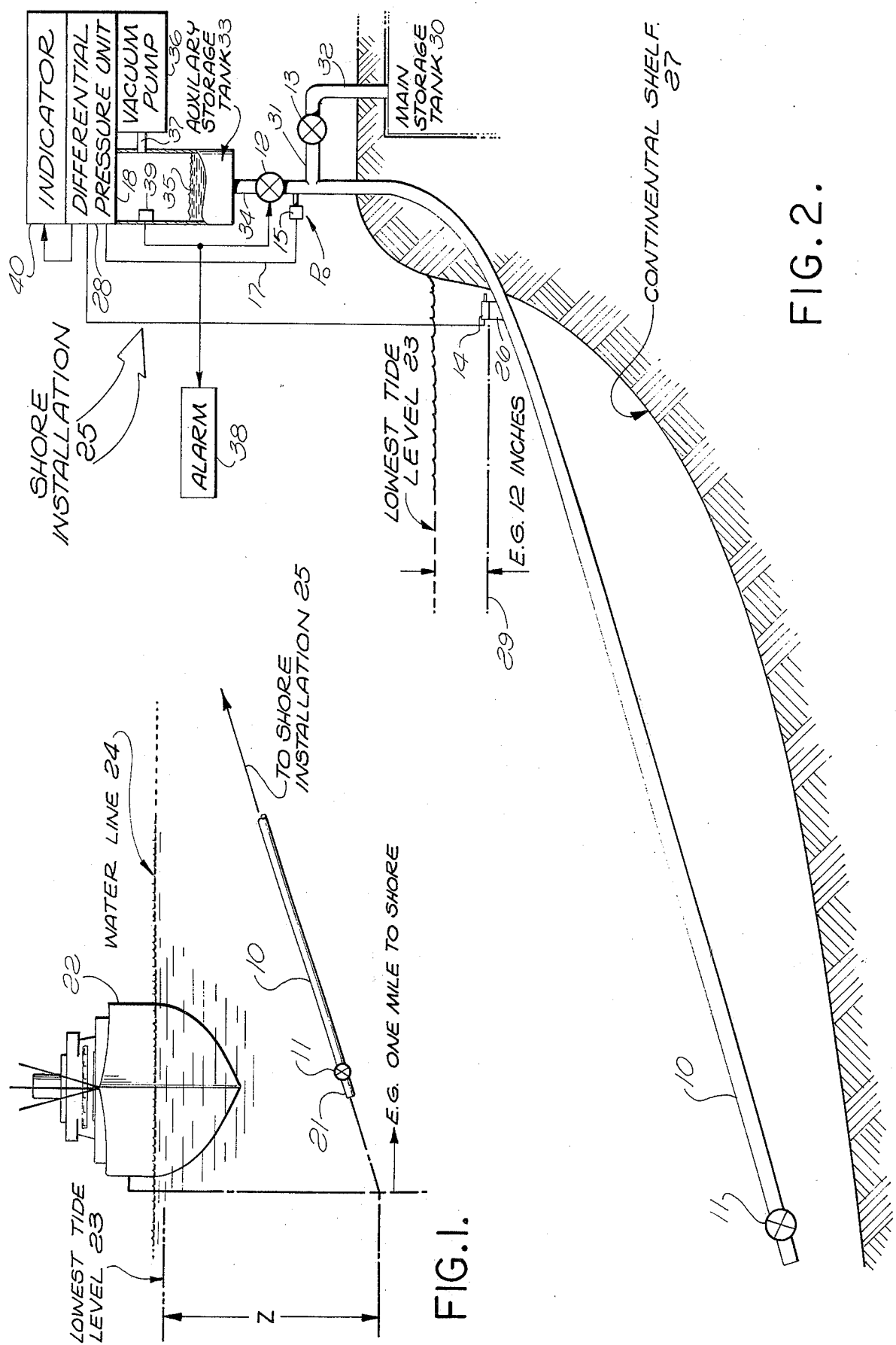

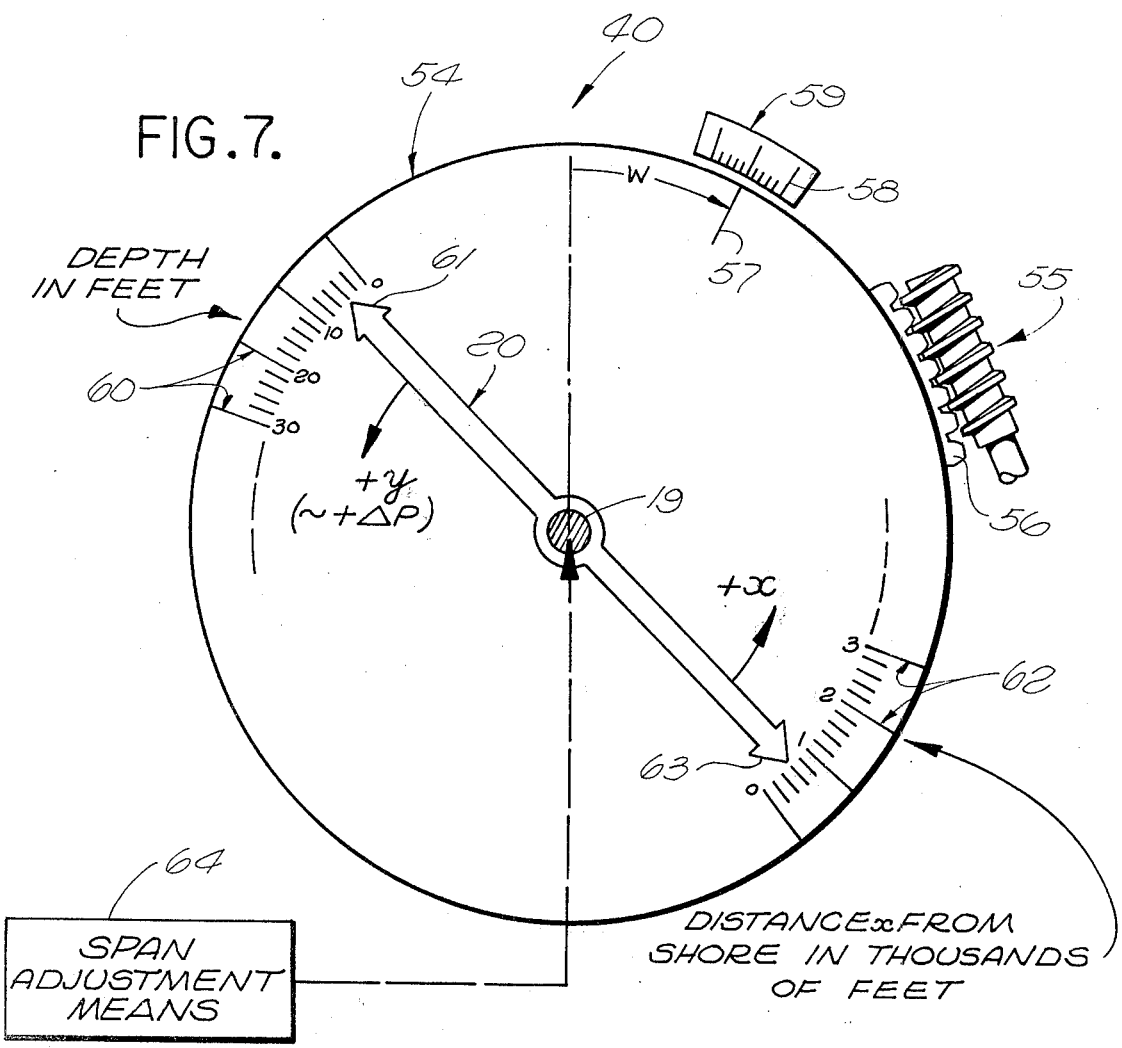

SUBMARINE PIPELINE LEAK LOCATOR OR THE LIKE

BACKGROUND OF THE INVENTION

This invention relates to underwater pipeline leak detection systems, and more particularly to a leak point locator.

In the past it has been the practice to find a leak in a sealed, oil-filled pipeline for ship-to-shore, or vice versa, oil delivery by drawing oil into an auxiliary tank and sounding an alarm when the oil in the auxiliary tank rises above a predetermined level. The location of the leak point is then determined by accurately controlling the vacuum pressure above the oil level in the auxiliary tank.

SUMMARY OF THE INVENTION

In accordance with the apparatus of the present invention, the above-described and other disadvantages of the prior art are overcome by determining the water pressure and oil pressure difference.

Although prior systems have incorporated a complicated and expensive controlled vacuum, it is an outstanding feature of the present invention that the pressure difference determination need not employ such a device. Other outstanding features of the present invention are that the pressure difference determination makes it possible to obtain the location of a leak in the pipeline independent of changes in atmospheric pressure, and independent of changes in tide level.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 1 is a diagrammatic view of a ship or tanker afloat in, for example, an ocean, approximately one mile from shore, having a connection to a hollow pipe section which, in turn, is connected to a pipeline via a valve;

FIG. 2 is a diagrammatic view of one embodiment of the present invention;

FIG. 6 is a table illustrating typical elevations of the pipeline shown in FIGS. 1 and 2 at individual points illustrated in FIG. 5; and FIG. 7 is a diagrammatic view of an indicator shown in FIG. 2.

DESCRIPTION OF THE PREFERRED EMBODIMENT

Figure 3:
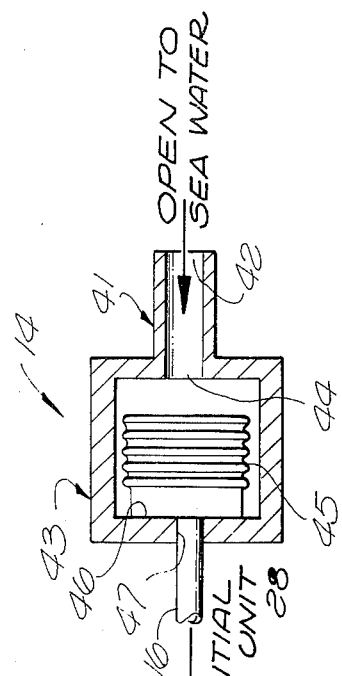
FIG. 3 is a longitudinal section view through a pressure sensor.

FIG. 1 is a diagrammatic view of a ship or tanker afloat in, for example, an ocean, approximately one mile from shore, having a connection to a hollow pipe section 21 which, in turn, is connected to a pipeline 10 via a valve 11. Pipeline 10 is inclined upwardly to the right toward the shore. Pipeline 10 is approximately one mile long and sinks from an elevation as shown in FIG. 2 to a depth in the ocean of, for example, the depth Z below the lowest tide level as shown in FIG. 2. Depth Z may be, for example, 42 feet or 500 inches or 504 inches. Depth Z is shown in FIG. 1.

The tanker is illustrated at 22. The connection from tanker 22 to pipe section 21 is entirely conventional.

In a typical arrangement, tanker 22 is connected to pipe section 21 by a flexible elastic or rubber hose, the upper end of which is provided with a valve that is closed when the hose is not in use. Valve 11 likewise is closed while the hose is not in use. Typically, the upper end of the hose is connected to a chain which is dropped downwardly into the water. The upper end of the chain is then connected to a buoy.

In FIG. 1, the lowest expected tide level is indicated at 23. A typical water line is indicated at 24.

A shore installation 25 is illustrated in FIG. 2 with pipeline 10. A bracket 26 is fixed to pipeline 10. A pressure sensor 14 is fixed to bracket 26. Typically, sensor 14 may be located 12 inches below the lowest expected tide level 23.

The continental shelf is indicated at 27.

A differential pressure unit is provided at 28. Differential pressure unit 28 may be any conventional differential pressure unit. Differential pressure unit 28 may be identical to that disclosed in any one of the patents contained in the following list:

U.S. Pat. Nos. 2,400,048; 2,590,324; 2,632,474; 2,664,749; 2,752,949; 2,814,458; 2,917,081; 2,925,096; 2,928,425; 2,945,510; 2,989,084; 3,756,126.

A pressure sensor 15 is connected to pipeline 10 at a point $P_o$. Pressure sensor 14 detects the water pressure at an elevation 29. Pressure sensor 15 detects the pressure of oil in pipeline 10 at point $P_o$.

Differential pressure unit 28 has inlet tubes 16 and 17 connected respectively from pressure sensors 14 and 15. Inlet tubes 16 and 17 are hollow and are both full of a fill fluid. The fill fluid may be entirely conventional.

A main storage tank 30 is provided into which oil is pumped from tanker 22 through pipe section 31, a valve 13 and a pipe section 32.

After main storage tank 30 has been filled, valve 13 is closed as well as valve 11. It is at this time that a leak is detected. Depending on the characteristics of the oil pumped through the line, as aforesaid, the line may be flushed and filled with a displacement oil before it is ready to sit idle and the leak detector used. (This may be necessary in most of the cases.) The flushing of the pipeline is a standard practice. A leak is not detected during the time that oil is being pumped from tanker 22 to main storage tank 30. Pipeline 10 may be used infrequently as once a week or once a month, for example.

An auxiliary storage tank is provided at 33 connected to pipeline 10 via pipe section 34 and a valve 12. Auxiliary storage tank 33 holds an additional supply of oil at 35. The oil at 35 is desired or necessary because when tanker 22 pumps oil into main storage tank 30, the temperature of the oil in pipeline 10 may be raised to a substantially elevated value. Thus, when valves 11 and 13 are shut off, the oil in pipeline 10 contracts, and the oil 35 in auxiliary storage tank 33 keeps the pipeline 10 full. A vacuum pump 36 is connected from auxiliary storage tank 33 by a conduit 37 which connects with auxiliary storage tank 33 above the upper surface of oil 35. In general, conduit 37 will enter auxiliary storage tank 33 at an elevation high enough so that oil 35 will never enter conduit 37.

Valve 12 is normally open. An alarm is provided at 38. A float switch 39 is provided inside auxiliary storage tank 33. Float switch 39 is connected both to valve 12 and alarm 38. Thus, when the upper level of oil 35 rises to the level of float switch 39, valve 12 is turned off, and alarm 38 is sounded. Alarm 38 is employed to announce a leak in pipeline 10 at any appropriate location where personnel can be made aware of the leak. It is at this point that the present invention is employed. Everything shown in FIG. 2 may be entirely conventional, if desired, except for bracket 26, pressure sensors 14 and 15, inlet tubes 16 and 17 and differential pressure unit 28. However, an indicator is provided at 40 which is connected from differential pressure unit 28 that is not employed in the prior art.

In FIG. 3, pressure sensor 14 is shown including a hollow tubular extension 41 which is open at both ends, and allows sea water to enter a right end 42 thereof.

Pressure sensor 14 has a housing 43 with a hollow interior into which sea water can enter, the sea water entering open end 42 of tubular extension 41, and entering the hollow interior of housing 43 at the left open end 44 of tubular extension 41. A hollow bellows 45 is provided inside housing 43 and is spaced from the walls thereof except for a wall 46 to which it is sealed. Housing 43 has a bore 47. Bellows 45 is sealed around bore 47. Inlet tube 16 is sealed in bore 47.

Figure 4:
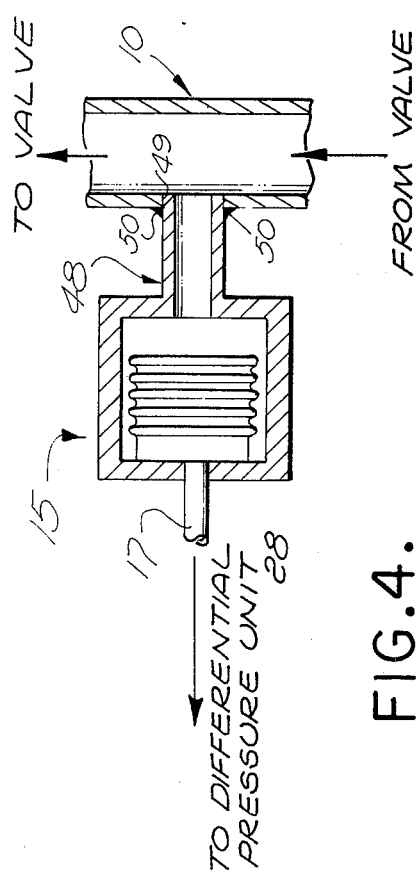
FIG. 4 is a longitudinal section view through a portion of a pipeline and through a pressure sensor.

In FIG. 4, pressure sensor 15 is shown. Pressure sensor 15 may be identical to pressure sensor 14, and thus will not be described in considerable detail. However, pressure sensor 15 does have a tubular extension 48 identical to tubular extension 41 shown in FIG. 3. Tubular extension 48 in FIG. 4 extends through a hole 49 in the wall of pipeline 10 and is sealed and welded to pipeline 10 at 50. The bellows of pressure sensors 14 and 15 have hollow interiors in communication with the interiors of inlet tubes 16 and 17, respectively.

Figure 5:
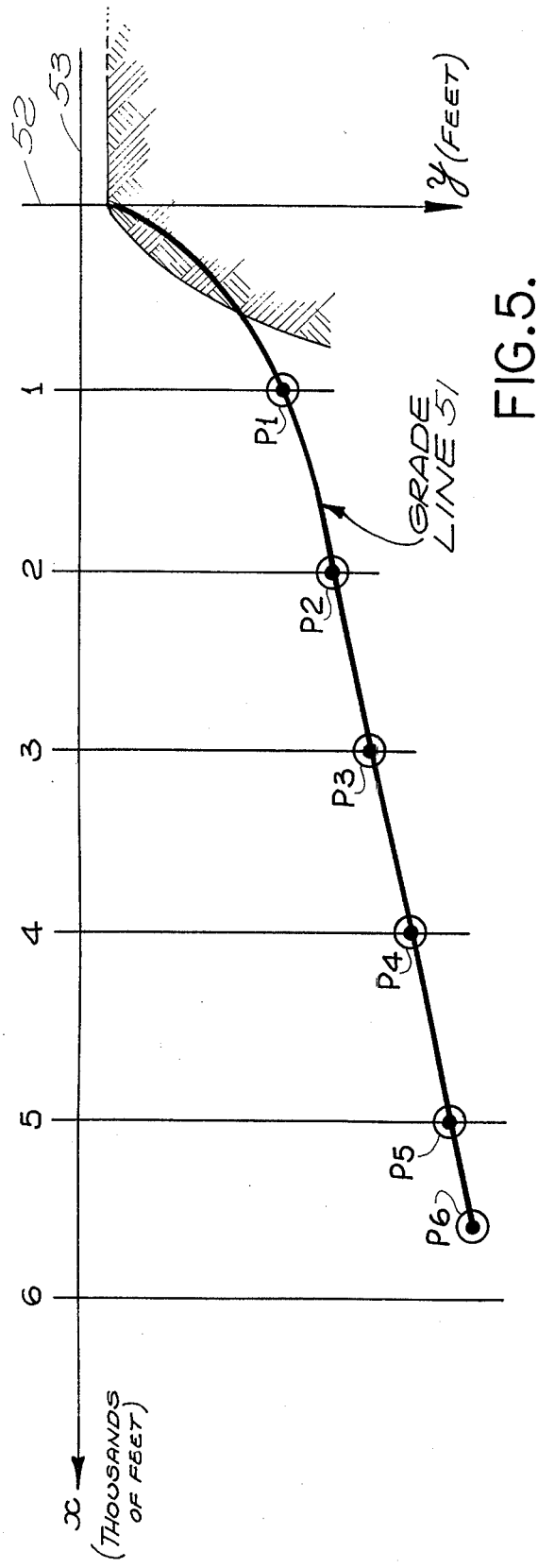
FIG. 5 is a diagrammatic view of the grade line of the pipeline illustrated in FIGS. 1 and 2.

The grade line of pipeline 10 is illustrated at 51 in FIG. 5. Typically, points P1, P2, P3, P4, P5 and P6 may lie on the grade line, the first five of the last-mentioned points lying, for example, on vertical lines in the same plane parallel to a y axis 52. The numbers at the top of these lines represent the distance from the y axis 52 in thousands of feet.

An x axis is illustrated at 53.

The grade line 51 will, of course, be known, since, after the pipeline 10 has been laid, its location and inclination can be surveyed. Alternatively, if it is laid to specifications, and it is accurately laid, the points P1 to P6 will be known.

Typical elevations of points P1 to P6 may be as shown in FIG. 6.

Indicator 40 may be as illustrated in FIG. 7 including a disc 54 which remains stationary except for a zero adjustment which may be made by rotation of a worm 55 which meshes with a worm gear segment 56 fixed relative to disc 54.

Disc 54 carries an index 57 which, when matched with indicia 58 on a scale 59, can adjust a constant to calibrate the system of the present invention. Rotation of worm 55 provides a zero adjustment W shown in FIG. 7. The zero adjustment W is equal to a constant referred to hereinafter as the constant V.

The indicator of FIG. 7 may have an entirely conventional span adjustment. One such adjustment is illustrated in U.S. Pat. No. 3,602,046. The entire contents of this patent is, by this reference hereto, incorporated herein hereat. The same is true of all of the following four copending applications. Another span adjustment is disclosed in copending application Ser. No. 402,336 filed Oct. 1, 1973, by L. T. Garnett for MECHANICAL SPAN AND ZERO ADJUSTMENT APPARATUS FOR PRESSURE TRANSMITTER.

The said copending application Ser. No. 402,336 may be made according to and used with all the structures disclosed in the following three copending applications, namely, copending application Ser. No. 402,361 filed Oct. 1, 1973, by L. T. Garnett and LaVerne Dean Lyon for PRESSURE SENSOR APPARATUS AND TRANSDUCER THEREFOR, copending application Ser. No. 402,035 filed Oct. 1, 1973, by LaVerne Dean Lyon for FLUID PRESSURE SENSING SYSTEM AND DIFFERENTIAL PRESSURE UNIT THEREFOR, and copending application Ser. No. 402,036 filed Oct. 1, 1973, by R. P. Granada for COLD WORKING PROCESS.

OPERATION

In the operation of the present invention, sea water normally has a specific gravity of about 1.024. Oil normally has a specific gravity of, for example, 0.9.

When float switch 39 closes valve 12 (the closure of valve 10 need not be automatic, but may be manual) and float switch 39 sounds alarm 38, with valves 11, 12 and 13 closed, indicator 40 will indicate the difference between the pressure of the water at elevation 29 and the pressure of the oil at point or elevation $P_o$. This indication will be directly proportional to the depth of the leak. Thus, in FIG. 7, disc 54 may have indicia 60 with which, with a pointer 61, the depth location of the leak may be indicated.

Pointer 61 is integral with a needle 20 fixed to a shaft 19. Shaft 19 may be the conventional output shaft of differential pressure unit 28. Shaft 19 rotates through an angle directly proportional to the difference in pressures in inlet tubes 16 and 17 at the elevation of differential pressure unit 28. The inclination and location of pipeline 10 shown in FIGS. 1 and 2 does not change. The grade line 51 in FIG. 5 thus does not change. Thus, the same disc 54 may be provided with indicia 62 so that a pointer 63 may be employed in conjunction therewith to indicate the distance the leak is from the y axis. The indicia 62 may be located in accordance with the grade line 51 shown in FIG. 5 of pipeline 10 shown in FIGS. 1 and 2. Pointer 63 may, as before, be integral with needle 20.

ADVANTAGES

It is one outstanding advantage of the present invention that a complicated and expensive controlled vacuum in auxiliary storage tank 33 above the level of oil 35 therein is not required to determine the location of any leak in pipeline 10 shown in FIGS. 1 and 2.

It is another outstanding advantage of the present invention that the location of the leak (the word "location" as used herein means depth and/or distance from shore) may be determined independent of changes in atmospheric pressure. Atmospheric pressure may change, for example, by one inch of mercury, which is equal to about 13 inches of water.

It is a still further outstanding advantage of the present invention that an accurate measure of the depth and/or distance to shore of a pipeline leak may be determined independent of changes in tide level. The location of the elevation or high tide above the lowest expected tide may be as much as 96 inches to 100 inches.

The manner in which an accurate determination of leak depth and/or distance from shore is determined independent of both atmospheric pressure and tide level is that both of the pressure sensors 14 and 15 receive these same pressures or pressure components.

Pressure sensor 14 may be located at the lowest tide level 23 shown in FIG. 2 and need not be located 12 inches therebelow, or any distance below the said lowest tide level 23, if desired. Moreover, the locations of pressure sensors 14 and 15 are by no means critical. Pressure sensor 14 must be located in the water. In practice it must be located below lowest tide level a distance such that it lies below the lowest expected trough level of a wave to avoid wave action.

Typically, pressure sensor 15 or point $P_o$ may be located a vertical distance above pressure sensor 14 equal to about 180 inches. However, as stated previously, this is by no means critical. Pressure sensor 15 may be buried at the same elevation as pressure sensor 14, if desired.

Differential pressure unit 28 may be located at a distance of 360 inches above the lowest tide level, but this distance is by no means critical. For example, differential pressure unit 28 may be located at or below the lowest tide level 23 shown in FIG. 2 so long as cavitation does not exist.

The symbol "$\Delta P$" shown in FIG. 7 represents the phrase "pressure difference." Span adjustment means are indicated at 64 in FIG. 7. Span adjustment means 64 may be of the type described hereinbefore.

In FIG. 7, indicia 60 is normally linear, but the linearity thereof need not be maintained. Depending upon the maximum angular rotation of differential pressure unit shaft 19 in FIG. 7, indicia 60 may be non-linear.

Indicia 62 shown in FIG. 7 may be linear or considerably non-linear, depending upon the curvature of pipeline 10 shown in FIGS. 1 and 2 and grade line 51 shown in FIG. 5.

The present invention may be described as "liquid delivery apparatus."

As stated previously, pipeline 10 is inclined relative to the horizontal as shown in FIG. 1. Pipeline 10, when valves 11, 12 and 13 in FIG. 2 are closed, is full of oil when there is no leak. This oil may be described as a "liquid." The density of the oil may be described as a "first predetermined density T."

The upper end of pipeline 10 may be described as "one end" thereof "mounted in a fixed position in proximity to the shore of a body of water." The water, whether sea water, fresh water or otherwise, may be described as "having a second predetermined density S greater than said first predetermined density."

The lower end of pipeline 10 may be described as the "other end" thereof "located in the water below the elevation of said one end."

Valves 12 and 13 in FIG. 2 and/or other structure may be described as: "First means to seal off said one pipe end."

Valve 11 and/or other structure may be described as: "Second means to seal off said other pipe end."

Pressure sensor 14, pressure sensor 15, inlet tube 16, inlet tube 17 and/or differential pressure unit 28 or any one or more or all of these structures or other structures may be described as: "Third means submerged in the water and fixed relative to and adjacent the shore, and also connected from said one pipeline end to produce an output directly proportional to the difference between the pressures in the water and pipeline."

As explained previously, differential pressure unit 28 has an output shaft illustrated at 19 in FIG. 7 to which needle 20 is fixed, shaft 19 rotating in direct proportion to the difference between the pressures of fluids filling inlet tubes 16 and 17 at the elevation of differential pressure unit 28. The output of the said third means thus is taken at the shaft 19 shown in FIG. 7.

The structure shown in FIG. 7 may be described as: "Fourth means to indicate the magnitude of said third means output."

The said third means may be described as including: "A first pressure sensor fixed relative to the shore and connected to said pipeline, a second pressure sensor fixed relative to the shore a vertical distance V beneath the lowest expected tide level, said first pressure sensor being located a vertical distance U above said second pressure sensor, a differential pressure unit having first and second inlet tubes connected from said first and second pressure sensors, respectively, said first and second inlet tubes containing a fill fluid, said differential pressure unit having an output shaft rotatable through an angle R in direct proportion to the difference in pressure inside said first and second inlet tubes at the elevation of said differential pressure unit." In the last quotation, the "first pressure sensor" may be pressure sensor 15, if desired. The "second pressure sensor" may be the pressure sensor 14, if desired. The "differential pressure unit" may be the differential pressure unit 28. The "pipeline" may be the pipeline 10. The "output shaft" may be shaft 19.

Inlet tubes 17 and 16 may be described as: "First and second inlet tubes," respectively.

The said "fourth means" may be described as "being connected from said output shaft." The "output shaft" last mentioned may also be the shaft 19 shown in FIG. 7.

In accordance with the foregoing, pipeline 10 is capable of developing a leak, although that is, of course, not the purpose of the present invention. Pipeline 10 may develop a leak at a hole somewhere along the length thereof between valve 11 and valves 12 and 13. The hole may extend through the wall of the pipeline 10, or the leak may be created in some other way. At any rate, the leak, if created at the depth $y$ and a distance $x$ from shore, $x$ and $y$ may be described as unknown variable Cartesian coordinates, the said fourth means being calibrated to read in one or both, but at least one of the said variables $x$ and $y$ where $$y = AR - B$$

and $$x = f(y),$$

$f(y)$ being determined by the grade line and location of said pipeline, and where $$A = \frac{1}{S - T}$$

$$B = \frac{(U)(Q - N)}{(S - T)}$$

and U is the density of said fill fluid.

$R = \Delta P$ sensed at DPU 28.

What is claimed is:

1. Liquid delivery apparatus comprising: an inclined pipeline full of a liquid having a first predetermined density T and having one end mounted in a fixed position in proximity to the shore of a body of water having a second predetermined density S greater than said first predetermined density, said inclined pipeline having its other end located in the water below the elevation of said one end; first means to seal off said one pipe end; second means to seal off said other pipe end; third means submerged in the water and fixed relative to and adjacent the shore, and also connected at a point $P_o$ from said one pipeline end to produce an output directly proportional to the difference between the pressure of the water and that of the liquid in the pipeline; and fourth means to indicate the magnitude of said third means output.

2. The invention as defined in claim 1, wherein said third means includes a first pressure sensor fixed relative to the shore and connected at said point $P_o$ to said pipeline, a second pressure sensor fixed relative to the shore a vertical distance V beneath the lowest expected tide level, said first pressure sensor being located a vertical distance $(Q - N)$ above said second pressure sensor, a differential pressure unit having first and second inlet tubes connected from said first and second pressure sensors, respectively, said first and second inlet tubes containing a fill fluid, said differential pressure unit having an output shaft rotatable through an angle R in direct proportion to the difference in pressure inside said first and second inlet tubes at the elevation of said differential pressure unit, said fourth means being connected from said output shaft, said pipeline being capable of developing a leak at a hole through the wall thereof or otherwise at a depth $y$ and a distance $x$ relative to the shore, $x$ and $y$ being unknown variable Cartesian coordinates, said fourth means being calibrated to read in one or both of said variables where
$$y = AR - B$$
and
$$x = f(y),$$
$f(y)$ being determined by the grade line and location of said pipeline, and where
$$A = \frac{1}{S - T}$$

$$B = \frac{(U)(Q - N)}{(S - T)}$$

and Q is the density of said fill fluid.

3. The invention as defined in claim 2, wherein said first means includes an auxiliary tank containing the said liquid connected from said pipeline one end above said point $P_o$, fifth means to evacuate the space above the liquid level in said auxiliary tank, a float device in said auxiliary tank, an alarm connected from said float device, said alarm being actuated by said float device when the liquid in said auxiliary tank rises above a predetermined level.

4. The invention as defined in claim 3, wherein said first means also includes a normally open auxiliary valve connected between said point $P_o$ and said auxiliary tank.

5. The invention as defined in claim 4, wherein said auxiliary valve is closed by said float device when said alarm is actuated.

6. The invention as defined in claim 5, wherein a main storage tank is provided, and conduit means including a main valve connected from said pipeline at a point between said second means and said auxiliary valve in proximity to the latter.

7. The invention as defined in claim 1, wherein said first means includes an auxiliary tank containing the said liquid connected from said pipeline one end above said point $P_o$, fifth means to evacuate the space above the liquid level in said auxiliary tank, a float device in said auxiliary tank, an alarm connected from said float device, said alarm being actuated by said float device when the liquid in said auxiliary tank rises above a predetermined level.

8. The invention as defined in claim 7, wherein said first means also includes a normally open auxiliary valve connected between said point $P_o$ and said auxiliary tank.

9. The invention as defined in claim 8, wherein said auxiliary valve is closed by said float device when said alarm is actuated.

10. The invention as defined in claim 9, wherein a main storage tank is provided, and conduit means including a main valve connected from said pipeline at a point between said second means and said auxiliary valve in proximity to the latter.

* * * * *